| (12) | United States Patent | (10) Patent No.: | US 8,811,345 B2 |
|---|---|---|---|
| | Chin et al. | (45) Date of Patent: | Aug. 19, 2014 |

(54) METHOD AND APPARATUS FOR FACILITATING USER EQUIPMENT BACKOFF DURING RANDOM ACCESS PROCEDURES

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/384,186

(22) PCT Filed: May 7, 2010

(86) PCT No.: PCT/US2010/034139
§ 371 (c)(1),
(2), (4) Date: Jan. 13, 2012

(87) PCT Pub. No.: WO2011/059522
PCT Pub. Date: May 19, 2011

(65) Prior Publication Data
US 2012/0275429 A1 Nov. 1, 2012

Related U.S. Application Data

(60) Provisional application No. 61/259,913, filed on Nov. 10, 2009.

(51) Int. Cl.
*H04W 4/00* (2009.01)

(52) U.S. Cl.
USPC .......................................... 370/331; 370/329

(58) Field of Classification Search
CPC ..................................................... H04W 80/04
USPC ................................................. 370/331, 329
See application file for complete search history.

(56) References Cited

U.S. PATENT DOCUMENTS

| 2002/0154653 | A1 | 10/2002 | Benveniste |
| 2002/0163929 | A1 | 11/2002 | Li et al. |
| 2004/0213199 | A1* | 10/2004 | Cheng ........................... 370/350 |
| 2004/0258040 | A1* | 12/2004 | Joshi et al. .................... 370/349 |
| 2005/0068979 | A1* | 3/2005 | Boer et al. .................... 370/445 |

(Continued)

FOREIGN PATENT DOCUMENTS

| CN | 101547423 A | 9/2009 |
| EP | 1424814 A1 | 6/2004 |
| EP | 1976170 A1 | 10/2008 |
| WO | WO2009121010 A2 | 10/2009 |

OTHER PUBLICATIONS

International Search Report and Written Opinion—PCT/US2010/034139, International Search Authority—European Patent Office—Aug. 16, 2010.
Taiwan Search Report—TW099115177—TIPO—Apr. 8, 2013.

*Primary Examiner* — Mark Rinehart
*Assistant Examiner* — Angel Brockman
(74) *Attorney, Agent, or Firm* — Kristine U. Ekwueme

(57) ABSTRACT

A method and apparatus for facilitating user equipment backoff during a random access procedure is provided. The method may comprise transmitting, by a user equipment (UE), at least one synchronization code to a Node B, determining that the at least one transmitted synchronization code was not acknowledged by the Node B, and modifying a maximum value of a random delay window in response to said determining.

48 Claims, 7 Drawing Sheets

(56) References Cited

U.S. PATENT DOCUMENTS

| | | | |
|---|---|---|---|
| 2007/0206531 A1* | 9/2007 | Pajukoski et al. | 370/329 |
| 2007/0293224 A1* | 12/2007 | Wang et al. | 455/436 |
| 2008/0310329 A1* | 12/2008 | Sun et al. | 370/280 |
| 2009/0175292 A1* | 7/2009 | Noh et al. | 370/462 |
| 2009/0252125 A1* | 10/2009 | Vujcic | 370/336 |
| 2010/0118698 A1 | 5/2010 | Yokobori et al. | |
| 2010/0165953 A1* | 7/2010 | Chen et al. | 370/335 |
| 2012/0008524 A1* | 1/2012 | Amirijoo et al. | 370/252 |

* cited by examiner

METHOD AND APPARATUS FOR FACILITATING USER EQUIPMENT BACKOFF DURING RANDOM ACCESS PROCEDURES

CROSS-REFERENCE TO RELATED APPLICATION(S)

This application claims the benefit of U.S. Provisional Patent Application No. 61/259,913, entitled "APPARATUS AND METHOD FOR FACILITATING USER EQUIPMENT BACKOFF DURING RANDOM ACCESS PROCEDURES," filed on Nov. 10, 2009, which is expressly incorporated by reference herein in its entirety.

BACKGROUND

1. Field

Aspects of the present disclosure relate generally to wireless communication systems, and more particularly, for facilitating user equipment backoff during a random access procedure.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associate UMTS networks.

As the demand for mobile broadband access continues to increase, research and development continue to advance the UMTS technologies not only to meet the growing demand for mobile broadband access, but to advance and enhance the user experience with mobile communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method includes transmitting, by a user equipment (UE), at least one synchronization code to a Node B, determining that the at least one transmitted synchronization code was not acknowledged by the Node B, and modifying a maximum value of a random delay window in response to said determining.

In an aspect of the disclosure, an apparatus includes means for transmitting, by a UE, at least one synchronization code to a Node B, means for determining that the at least one transmitted synchronization code was not acknowledged by the Node B, and means for modifying a maximum value of a random delay window in response to said determining.

In an aspect of the disclosure, a computer program product includes a computer-readable medium which includes code for transmitting, by a UE, at least one synchronization code to a Node B, code for determining that the at least one transmitted synchronization code was not acknowledged by the Node B, and code for modifying a maximum value of a random delay window in response to said determining.

In an aspect of the disclosure, an apparatus includes at least one processor, and a memory coupled to the at least one processor. In such an aspect, the at least one processor may be configured to transmit, by a UE, at least one synchronization code to a Node B, determine that the at least one transmitted synchronization code was not acknowledged by the Node B, and modify a maximum value of a random delay window in response to said determining.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
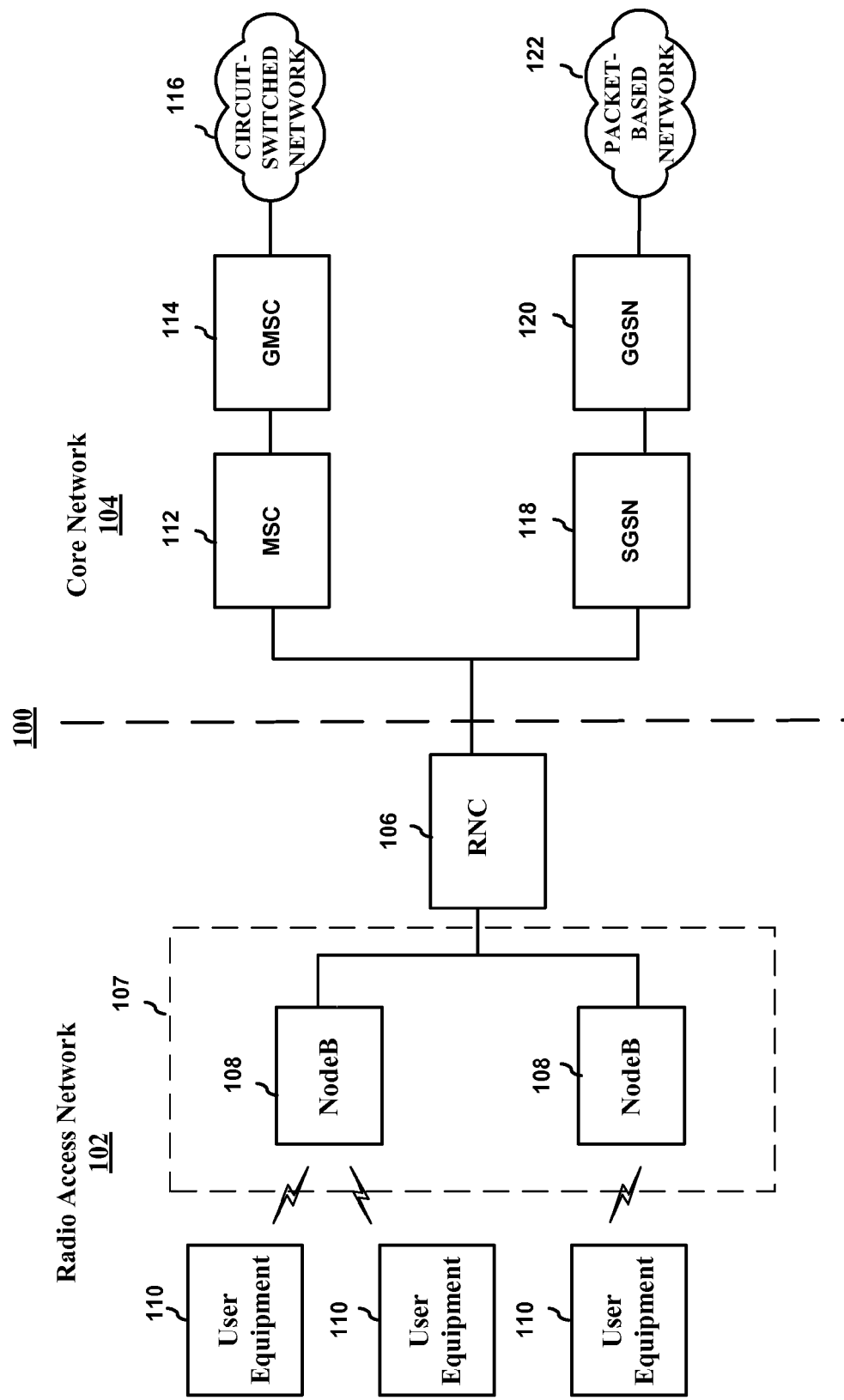
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provides wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a Node B 108 and a UE 110, but divides uplink and downlink transmissions into different time slots in the carrier.

Figure 2:
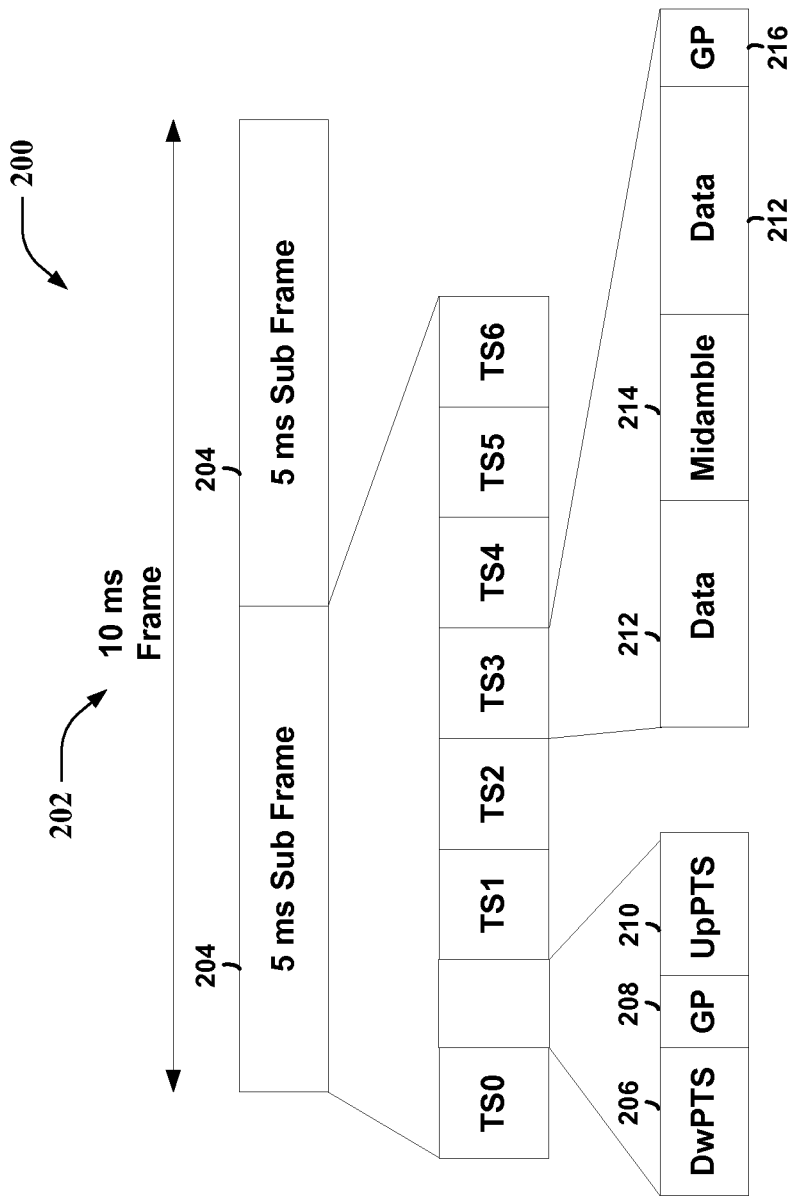
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference.

Figure 3:
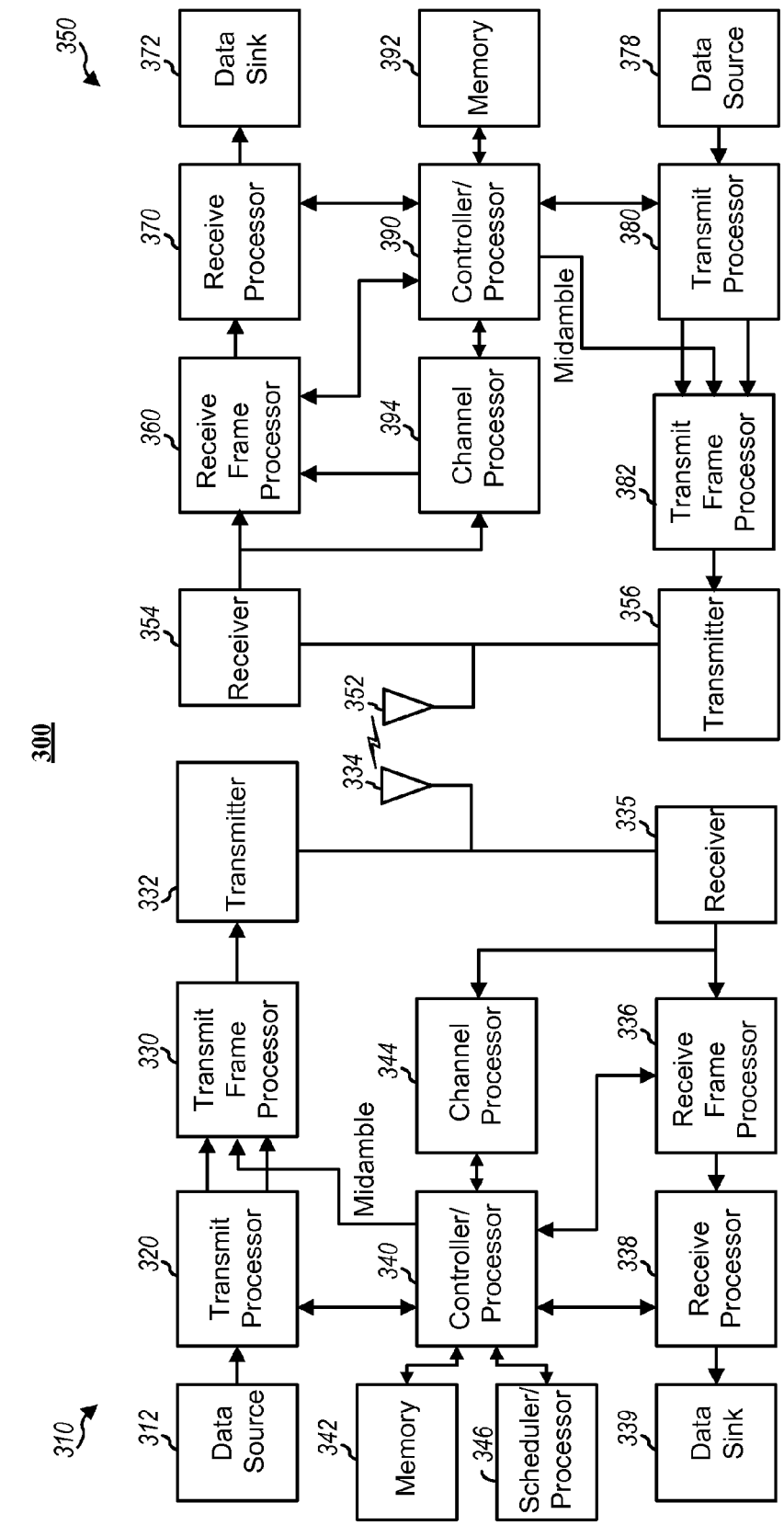
FIG. 3 is a block diagram conceptually illustrating an example of a Node B in communication with a UE in a telecommunications system.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an ACK and/or NACK protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

In one aspect, controller/processors 340 and 390 may enable communications using a random access procedure. Generally, in a TD-SCDMA system, using a random access procedure, various channels and configurations may be used. For example, a random access channel (RACH) transmission time interval (TTI) may be denoted by L subframes (e.g., 1 for 5 ms, 2 for 10 ms, 4 for 20 ms), and one FPACH may correspond to N PRACHs, where N≤L. As such, the network may send an ACK on FPACH on a subframe number SFN' mod L=0, 1 . . . N−1. One example of a general FPACH ACK is discussed with reference to Table 1.

TABLE 1

TD-SCDMA standard FPACH ACK

| Field | Length | Description |
|---|---|---|
| Signature Reference Number | 3 (MSB) | Indicate SYNC_UL code |
| Relative Sub-Frame Number | 2 | Sub-Frame number preceding the ACK |
| Received starting position of the UpPCH (UpPCH$_{POS}$) | 11 | Used for timing correction |
| Transmit Power Level Command for RACH message | 7 | Used for transmit power level in PRACH |
| Reserved bits | 9 (LSB) | N/A |

Further, if the UE receives FPACH on subframe number j mod L=n, then it uses PRACH n to transmit to avoid a collision with another UE. Still further, transmission of RACH may start two subframes following FPACH reception, but if FPACH is received on an odd subframe number and L>1, then transmission of RACH may start three subframes following FPACH reception.

In one aspect of the RAN 300, UE 350 and Node B 310 may communicate using a random access procedure facilitated through random access modules which are operable to reduce the possibility of multiple UEs attempting to communicate with the Node B 310 using the same random access resources. The UE may transmit a synchronization code to the Node B as part of the random access procedure. In one aspect, the UE may transmit the synchronization code during an initial access procedure. In another aspect, the UE may transmit the synchronization code during a hard handover procedure. Further, in such an aspect, a Node B may bias a response to a UE performing hard handover over a UE performing initial access.

Further, UE 350 may include an enhanced backoff module which may be operable to provide various backoff schemes for UE 350 so as to attempt to avoid SYNC_UL code collisions during random access requests. Such backoff schemes may include an enhanced backoff scheme, an exponential backoff scheme, an adaptive load backoff scheme, an explicit load indication backoff scheme, etc. In one aspect, the exponential backoff scheme may be operable to exponentially increase a backoff window size for each iteration after unsuccessfully attempting a random access procedure. In another aspect, an adaptive load backoff scheme may estimate UpPTS loading and may modify an upper window boundary for selecting a random backoff delay in response to the estimated UpPTS loading. In still another aspect, an explicit load indication backoff scheme may be operable to determine whether a message sent by the Node B includes a high load flag. If the message includes a high load flag, an explicit load indication backoff scheme may modify an upper window boundary for selecting a random backoff delay.

Figure 4:
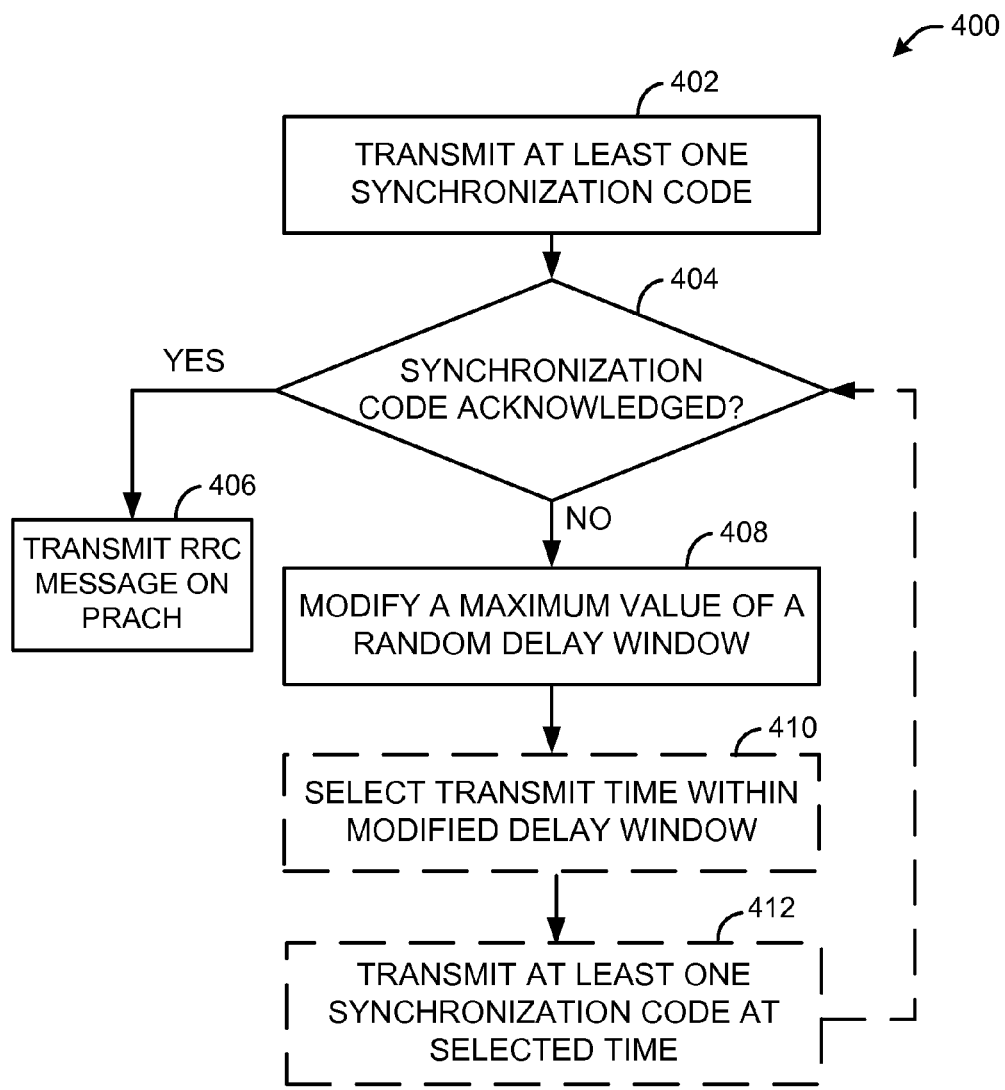
FIG. 4 is a functional block diagram conceptually illustrating example blocks executed to implement the functional characteristics of one aspect of the present disclosure.
Figure 5:
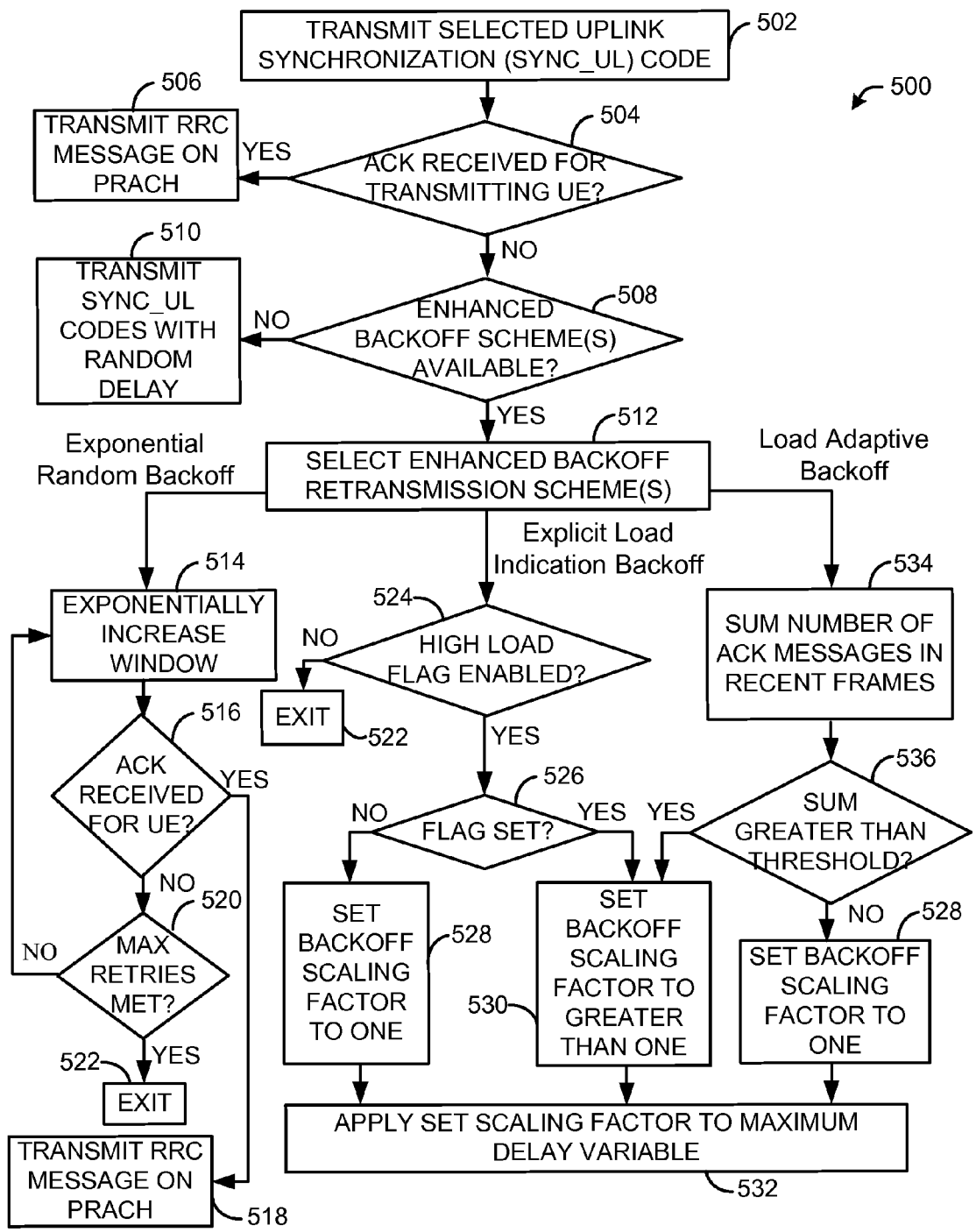
FIG. 5 is another functional block diagram conceptually illustrating example blocks executed to implement the functional characteristics of one aspect of the present disclosure.

In operation, random access modules may reduce the likelihood of UL collisions using a variety of backoff schemes. Operation of such backoff schemes is depicted in FIGS. 4 and 5. As an example, in an exponential random backoff scheme, if the UE 350 does not receive an ACK and/or a received response is not intended for the UE, the UE may exponentially increase an upper boundary of a backoff delay window. In one aspect, the backoff delay window used before a second transmission attempt may be defined using equation (1):

$$0 \leq N_{min} \leq N \leq N_{max}(k) \tag{1}$$

Where N is the random number of frames that are backed off before a second transmission attempt is made, with $N_{min}$ and $N_{max}(k)$ defining the boundaries of backoff delay window. Further, in such an aspect, $N_{max}(k)$ be initially set to $N_{max}(0)$ and may be defined in equation (2):

$$N_{max}(k) = \min\{\lfloor \alpha \cdot N_{max}(k-1) \rfloor, M\}, k=1,2,\ldots K-1 \tag{2}$$

Where, k is the number of unsuccessful uplink synchronization attempts, K is a maximum number of transmissions of uplink synchronization codes, $\lfloor * \rfloor$ is a floor function, parameter $\alpha > 1$ is an exponential growth factor, and M is the maximum of random delay window. Therefore, if the UE has not received a response, then the UE may scale up the delay window in equation (1) by an exponential factor.

As another example, in an adaptive load backoff scheme, a UE may estimate a Node B is experiencing high load conditions. In order to estimate the Node B loading, the UE may monitor the received FPACH response among all configured FPACHs and the UE may count the number of ACKs received which are or are not intended for the UE. As such, the UE may indirectly estimate the loading since each ACK messages received may correspond to a UE having sent a SYNC_UL code. Specifically, the UE may monitor the number of FPACH ACK messages in the last L frames with frame numbers: j−L−1, j−L−2 . . . j. Then the UE can count the total number of ACK messages over these frames for all FPACHs, denoted by n(j). Further, if UE has failed to receive FPACH ACK message, it delays sending a transmission of SYNC_UL by a random variable N within the range defined in equation (3), as follows:

$$0 \leq N_{min} \leq N \leq N_{max} * c \tag{3}$$

Where N is the random number of frames that are backed off before a retransmission attempt is made, with $N_{min}$ and $N_{max}$ defining the boundaries of backoff delay window. As used with this scheme, c may be a scaling factor used to modify the $N_{max}$ value, as follows in equations (4a) and (4b):

$$c=1, \text{if } n(j) \leq Th \tag{4a}$$

$$c=\gamma>1, \text{if } n(j)>Th \tag{4b}$$

Where the parameter Th is used for scale up the backoff delay window whereby a larger window is used if more ACK messages are observed than the threshold. While equations (4a) and (4b) only depict a single threshold, multiple threshold levels may be used with various backoff delay window sizes to reduce loading on the Node B.

Therefore, if the UE determines the Node B has a higher load than a threshold value, then the UE may scale up the window in equation (3) by a value (c) greater than one.

As yet another example, in an explicit load indication scheme, if the Node B detects high loading conditions (e.g., more than a defined number of UEs sending SYNC_UL codes), then the Node B may send a modified FPACH ACK message including a high load flag. An exemplary FPACH ACK message including a high load flag is described in Table 2.

TABLE 2

Modified FPACH ACK

| Field | Length | Description |
|---|---|---|
| Signature Reference Number | 3 (MSB) | Indicate SYNC_UL code |
| Relative Sub-Frame Number | 2 | Sub-Frame number preceding the ACK |
| Received starting position of the UpPCH (UpPCH$_{POS}$) | 11 | Used for timing correction |
| Transmit Power Level Command for RACH message | 7 | Used for transmit power in PRACH |

TABLE 2-continued

Modified FPACH ACK

| Field | Length | Description |
|---|---|---|
| UpPTS High load flag | 1 | If the Flag is set to 1, the Node B receives high loading in UpPTS. |
| Reserved bits | 8 (LSB) | N/A |

When one or more of the UE 350 receive the ACK with the high load flag set, the UE 350 may determine that the Node B is receiving a high volume of access requests. After receiving the ACK with the high load flag, the UE may modify an upper window boundary for selecting a random backoff delay in response to the high load flag. In one aspect, the backoff delay window used before a second transmission attempt may be defined using equation (3), as decided above. Where N is the random number of frames that are backed off before a retransmission attempt is made, with $N_{min}$ and $N_{max}$ defining the boundaries of backoff delay window. As used with this scheme, c may be a scaling factor used to modify the $N_{max}$ value. For example, when a high load flag is received, c is set to a value greater than one. By contrast, if no high load flag is received c may be set to one. Therefore, if the UE has received a high load condition (e.g., the UpPTS High Load Flag is set to 1), then the UE may scale up the window in equation (3) by a value greater than one.

In one configuration, the apparatus 350 for wireless communication includes means for transmitting, by a UE, at least one synchronization code to a Node B, means for determining that the at least one transmitted synchronization code was not acknowledged by the Node B, and means for modifying a maximum value of a random delay window in response to said determining. In one aspect, the aforementioned means may be the processor(s) 370, 390 configured to perform the functions recited by the aforementioned means. In another aspect, the aforementioned means may be a module or any apparatus configured to perform the functions recited by the aforementioned means.

FIGS. 4 and 5 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 4 is a functional block diagram 400 illustrating example blocks executed in conducting wireless communication according to one aspect of the present disclosure. In block 402, a UE may transmit at least one synchronization code to a Node B. In one aspect, the transmission may be performed in a time division synchronous code division multiple access (TD-SCDMA) system. In one aspect, the at least one synchronization code may be transmitted as part of a random access procedure. In such an aspect, a random access procedure may be used for initial access, hard handover, etc. In one aspect, the UE may transmit a synchronization code during an initial access procedure. In another aspect, the UE may transmit a synchronization code during a hard handover procedure. Further, in such an aspect, a Node B may bias a response to a UE performing hard handover over a UE performing initial access procedures.

In block 404, it is determined whether the at least one transmitted synchronization code was acknowledged. In one aspect, a determination that there was no acknowledgement may be made after a defined time has lapsed. In another aspect, the UE may receive a message indicating the at least one transmitted synchronization code was not acknowledged. If in block 404, it is determined that the at least one transmitted synchronization code was acknowledged, then, in block 406, the UE may communicate with the acknowledging Node B. In one aspect, the UE may transmit a Radio Resource Control (RRC) message on a physical random access channel (PRACH) set up through processing the received acknowledgement. In another aspect, where the UE is performing a hard handover, the received acknowledgement may be generated by the Node B with a bias to the UE performing a hard handover over a UE performing initial access.

By contrast, if in block 404 it is determined that the at least one transmitted synchronization code was not acknowledged, then, in block 408, a maximum value of a random delay window may be modified. In one aspect, the maximum value of a random delay window may be modified by obtaining a number of times the UE has attempted to connect to the Node B, and expanding the random delay window based on the obtained number. In another aspect, the maximum value of a random delay window may be modified by obtaining a number of acknowledgements transmitted by the Node B, said acknowledgements directed to one or more other UEs, determining that the obtained number of acknowledgements is above a threshold, and expanding the random delay window based on the determination. In still another aspect, the maximum value of a random delay window may be modified by determining a load condition based on an acknowledgment transmitted by the Node B, and expanding the random delay window based on the load condition. In such an aspect, the load condition may be determined through the presence of an active load flag in a received message from the Node B.

Additionally, in one optional aspect, in block 410, a transmit time within the modified delay window may be selected, and in block 412, at least one synchronization code may be transmitted to the Node B. In one aspect, the process may be terminated when the maximum value of the random delay window reaches defined value.

FIG. 5 is a functional block diagram 500 illustrating example blocks executed in conducting wireless communication according to one aspect of the present disclosure. As depicted in FIG. 5, any reference made to TD-SCDMA protocols, processes, etc., is not intended to limit the scope of the claimed subject matter, but rather is provided as an exemplary aspect. In block 502, a UE may transmit at least one uplink synchronization (SYNC_UL) code. In one aspect, the UE may transmit a synchronization code during an initial access procedure. In another aspect, the UE may transmit a synchronization code during a hard handover procedure. Further, in such an aspect, a Node B may bias a response to a UE performing hard handover over a UE performing initial access procedures. In block 504, it is determined whether a message is received including an ACK intended for the UE. If in block 504, it is determined that an ACK response, intended for the UE, is received, then in block 506 the UE may transmit a Radio Resource Control (RRC) message to the corresponding PRACH. By contrast, if in block 504, it is determined that an ACK intended for the UE is not received, then in block 508, it is determined whether the UE is enabled to use one or more enhanced backoff schemes. If in block 508 it is determined that the UE is not enabled to use one or more enhanced backoff schemes, then in block 510, the UE may adjust its transmission time and/or transmit power level based on a new measurement and may send a SYNC-UL after a random delay. By contrast, if in block 508, it is determined that the UE is enabled to use one or more enhanced backoff schemes, then in block 512, one or more enhanced backoff retransmission schemes may be selected.

In one aspect, an exponential random backoff scheme may be used. In such an aspect, in block 514, the UE may exponentially increase an upper boundary of a backoff delay window and may select a random transmission frame within the backoff delay window to transmit a SYNC_UL code. In block 516, it is determined whether an ACK intended for the UE is received. If in block 516, it is determined that an ACK is received and intended for the UE, then in block 518, the UE may transmit a Radio Resource Control (RRC) message using the corresponding PRACH. By contrast, if in block 516, it is determined that an ACK intended for the UE is not received, then in block 520, it is determined whether a maximum number of access requests has been reached. If in block 520, the maximum number of access requests has been reached, then in block 522 the enhanced backoff process may stop. By contrast, if in block 520, the maximum number of access requests has not been reached, then in block 514 a counter may be iterated and a new backoff delay window may be generated in response to the iterated counter.

In another aspect, an explicit load indication backoff scheme may be used. In such an aspect, in block 524, it is determined whether a high load flag value in the Node B response is enabled. If in block 524, it is determined that the high load flag is not enabled, then in block 522 the enhanced backoff process may stop. By contrast, if in block 524, it is determined that the high load flag is enabled then in block 526, it is determined whether the high load flag has been set (e.g., set to a 1 value). If in block 526 it is determined that the high load flag has not been set then, in block 528, a backoff scaling factor may not be increased (e.g., set to one). By contrast, if in block 526 it is determined the high load is set then, in block 530, a backoff scaling factor may be set to a value greater than one. In block 532, the determined scaling factor may be applied to an upper boundary value for a backoff delay window, and the UE may randomly select a frame within the modified window during which to transmit a SYNC_UL code.

In still another aspect, a load adaptive backoff scheme may be used. In such an aspect, in block 534, the UE may sum the number of ACKs received which are or are not intended for the UE, during a defined time interval. Specifically, the UE may monitor the number of FPACH ACK messages in the last L frames with frame numbers: j–L–1, j–L–2 . . . j. Then the UE may count the total number of ACK messages over these frames for all FPACHs, denoted by n(j). In block 536, it is determined whether the summed number of ACKs is greater than a threshold value. If in block 536, it is determined that the summed number of ACKs is not greater than the threshold value, then in block 528 a backoff scaling factor may not be increased (e.g., set to one). By contrast, if in block 536 it is determined that the summed number of ACKs is greater than the threshold value then, in block 530, a backoff scaling factor may be set to a value greater than one. In block 532, the determined scaling factor may be applied to an upper boundary value for a backoff delay window, and the UE may randomly select a frame within the modified window during which to transmit a SYNC_UL code.

Figure 6:
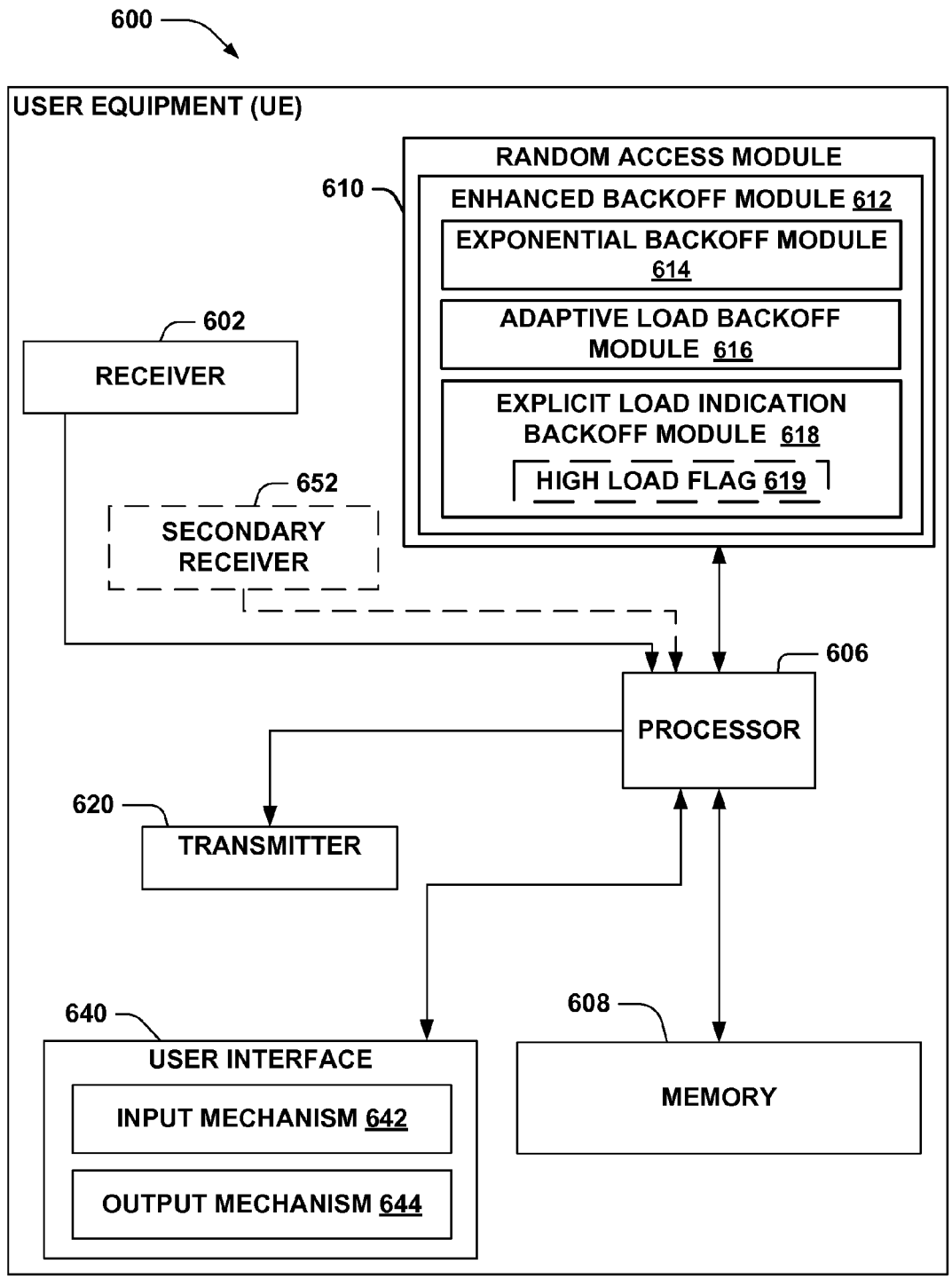
FIG. 6 is a block diagram of an exemplary wireless communications device configured to facilitate user equipment backoff during a random access procedure according to an aspect.

With reference now to FIG. 6, an illustration of a UE 600 (e.g., a client device, wireless communications device (WCD), etc.) that can facilitate user equipment backoff during a random access procedure is presented. UE 600 comprises receiver 602 that receives one or more signal from, for instance, one or more receive antennas (not shown), performs typical actions on (e.g., filters, amplifies, downconverts, etc.) the received signal, and digitizes the conditioned signal to obtain samples. Receiver 602 can further comprise an oscillator that can provide a carrier frequency for demodulation of the received signal and a demodulator that can demodulate received symbols and provide them to processor 606 for channel estimation. In one aspect, UE 600 may further comprise secondary receiver 652 and may receive additional channels of information.

Processor 606 can be a processor dedicated to analyzing information received by receiver 602 and/or generating information for transmission by one or more transmitters 620 (for ease of illustration, only one transmitter is shown), a processor that controls one or more components of UE 600, and/or a processor that both analyzes information received by receiver 602 and/or secondary receiver 652, generates information for transmission by transmitter 620 for transmission on one or more transmitting antennas (not shown), and controls one or more components of UE 600.

UE 600 can additionally comprise memory 608 that is operatively coupled to processor 606 and that can store data to be transmitted, received data, information related to available channels, data associated with analyzed signal and/or interference strength, information related to an assigned channel, power, rate, or the like, and any other suitable information for estimating a channel and communicating via the channel. Memory 608 can additionally store protocols and/or algorithms associated with estimating and/or utilizing a channel (e.g., performance based, capacity based, etc.).

It will be appreciated that the data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 608 of the subject systems and methods is intended to comprise, without being limited to, these and any other suitable types of memory.

UE 600 can further comprise random access module 610 which may be operable to provide various backoff schemes for UE 600 so as to attempt to avoid SYNC_UL code collisions during random access. In one aspect, the UE may use random access during an initial access procedure. In another aspect, the UE may use random access during a hard handover procedure. Further, in such an aspect, a Node B may bias a response to a UE performing hard handover over a UE performing initial access procedures. In one aspect of the UE 600, enhanced backoff module 612 may include exponential backoff module 614, adaptive load backoff module 616, and explicit load indication backoff module 618. In one aspect, exponential backoff module 614 may be operable to exponentially increase a backoff window after each unsuccessfully attempted random access. In another aspect, adaptive load backoff module 616 may estimate UpPTS loading and may modify an upper window boundary for selecting a random backoff delay in response to the estimated UpPTS loading. In still another aspect, explicit load indication backoff module 618 may be operable to determine whether an ACK sent by the base station includes a high load flag 619. If the ACK includes a high load flag 619, explicit load indication backoff module 618 may modify an upper window boundary for selecting a random backoff delay in response to the high load flag 619. Operation of such backoff schemes is depicted in FIGS. 4 and 5.

Moreover, in one aspect, processor 606 may provide the means for transmitting, by the UE 600, at least one synchronization code to a Node B, means for determining that the at least one transmitted synchronization code was not acknowledged by the Node B, and means for modifying a maximum value of a random delay window in response to said determination.

Additionally, UE 600 may include user interface 640. User interface 640 may include input mechanisms 642 for generating inputs into UE 600, and output mechanism 644 for generating information for consumption by the user of UE 600. For example, input mechanism 642 may include a mechanism such as a key or keyboard, a mouse, a touch-screen display, a microphone, etc. Further, for example, output mechanism 644 may include a display, an audio speaker, a haptic feedback mechanism, a Personal Area Network (PAN) transceiver etc. In the illustrated aspects, output mechanism 644 may include a display operable to present content that is in image or video format or an audio speaker to present content that is in an audio format.

Figure 7:
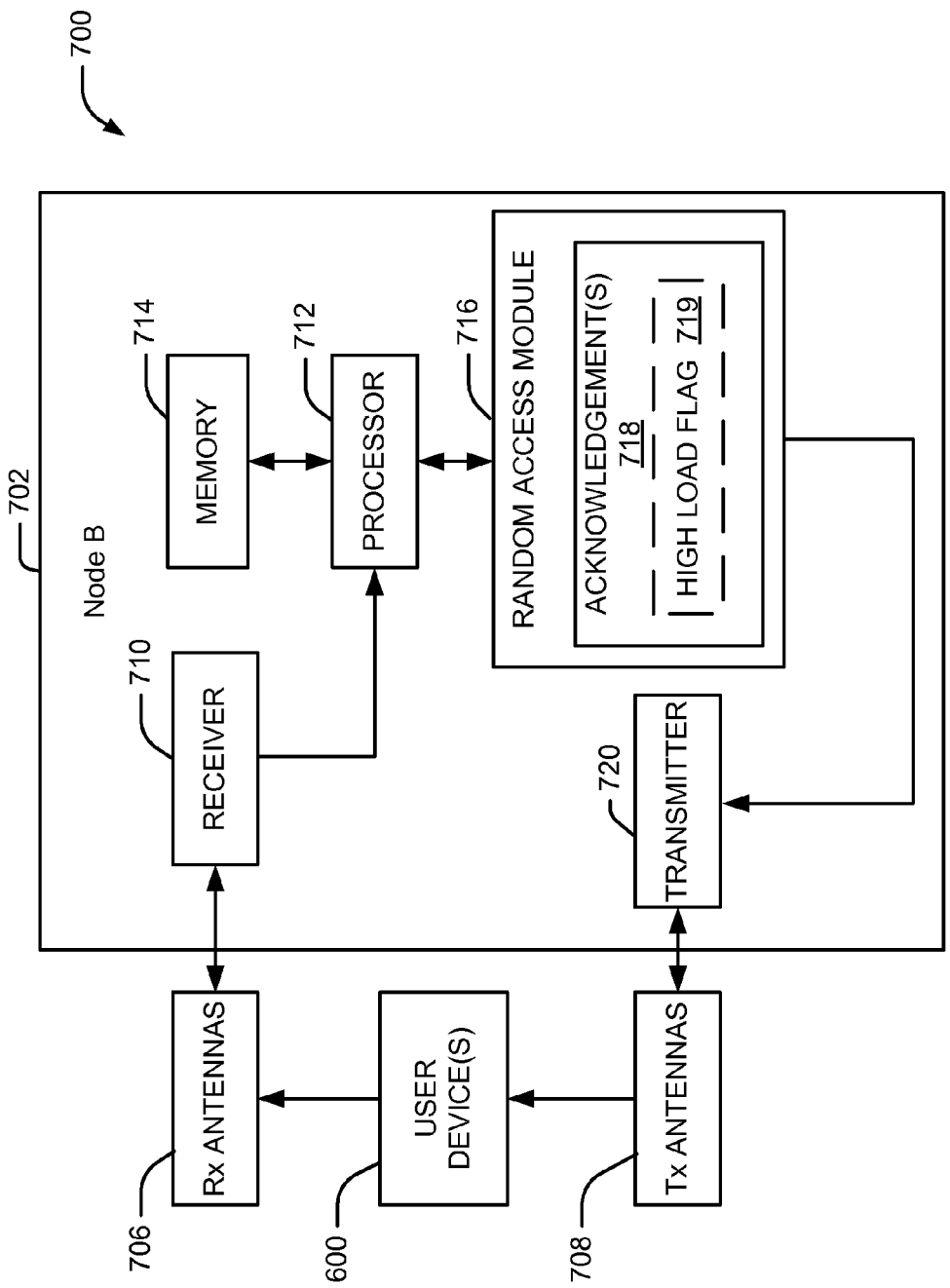
FIG. 7 is a block diagram depicting the architecture of a Node B configured to facilitate user equipment backoff during a random access procedure according to an aspect.

With reference to FIG. 7, an example system 700 that comprises a Node B 702 with a receiver 710 that receives signal(s) from one or more user devices 600 through a plurality of receive antennas 706, and a transmitter 720 that transmits to the one or more user devices 600 through a plurality of transmit antennas 708. Receiver 710 can receive information from receive antennas 706. Symbols may be analyzed by a processor 712 that is similar to the processor described above, and which is coupled to a memory 714 that stores information related to data processing. Processor 712 is further coupled to a random access module 716 that facilitates communications with one or more respective user devices 600 while attempting to avoid possible collisions during random access procedures.

In one aspect, random access module 716 may reduce the likelihood of UL collisions using a variety of enhanced backoff schemes, such as but not limited to, an enhanced backoff scheme, an exponential backoff scheme, an adaptive load backoff scheme, an explicit load indication backoff scheme, etc. In one such aspect, a high load flag 719 may be used in a message sent from the Node B 702 (e.g., an acknowledgement 718) to communicate that multiple UEs may be attempting to access the Node B 702 in a manner which may lead to collisions. In such an aspect, a threshold number of UE 600 access requests may be used to determine whether to trigger the high load flag 719.

In one aspect, the UE 600 may transmit a synchronization code during an initial access procedure. In another aspect, the UE 600 may transmit a synchronization code during a hard handover procedure. Further, in such an aspect, the Node B 702 may bias a response to a UE 600 performing hard handover over a UE 600 performing an initial access procedure.

Several aspects of a telecommunications system has been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   transmitting, by a user equipment (UE), at least one synchronization code to a Node B;
   determining that the at least one transmitted synchronization code was not acknowledged by the Node B; determining a load condition of the Node B based on acknowledgements for other UEs transmitted by the Node B; and modifying an upper boundary of a random delay window in response to at least one of said determining that the at least one transmitted synchronization code was not acknowledged by the Node B or determining the load condition of the Node B based on the acknowledgements for the other UEs transmitted by the Node B.

2. The method of claim 1, wherein said modifying comprises:
   obtaining a number of times the UE has attempted to connect to the Node B; and
   expanding the random delay window based at least in part on the obtained number.

3. The method of claim 1, wherein said modifying comprises:
   obtaining a number of acknowledgements transmitted by the Node B;
   determining that the obtained number of acknowledgements is above a threshold; and
   expanding the random delay window based at least in part on the determination that the obtained number of acknowledgements is above the threshold.

4. The method of claim 1, wherein said modifying comprises:
   expanding the random delay window based at least in part on the load condition.

5. The method of claim 1, wherein the load condition is determined by receiving a load condition flag in a message transmitted by the Node B.

6. The method of claim 1, wherein the at least one synchronization code is transmitted as part of a random access procedure.

7. The method of claim 6, wherein the random access procedure is used for at least one of: an initial access, or a hard handover.

8. The method of claim 6, further comprising:
   terminating the random access procedure when the upper boundary of the random delay window reaches a defined value.

9. The method of claim 1, further comprising:
   selecting a frame within the modified random delay window within which to transmit a second synchronization code to the Node B.

10. The method of claim 9, wherein the at least one synchronization code is transmitted as part of a request to perform a hard handover, further comprising:
    receiving a first acknowledgement from the Node B, wherein the first acknowledgement was generated by the Node B with a bias towards establishing communications with the UE requesting to perform the hard handover.

11. The method of claim 1, wherein the wireless communication is enabled in a time division synchronous code division multiple access (TD-SCDMA) system.

12. An apparatus for wireless communication, comprising:
    means for transmitting, by a user equipment (UE), at least one synchronization code to a Node B;
    means for determining that the at least one transmitted synchronization code was not acknowledged by the Node B; means for determining a load condition of the Node B based on acknowledgements for other UEs transmitted by the Node B; and
    means for modifying an upper boundary of a random delay window in response to at least one of said determining that the at least one transmitted synchronization code was not acknowledged by the Node B or determining the load condition of the Node B based on the acknowledgements for the other UEs transmitted by the Node B.

13. The apparatus of claim 12, wherein said means for modifying comprises:
    means for obtaining a number of times the UE has attempted to connect to the Node B; and
    means for expanding the random delay window based at least in part on the obtained number.

14. The apparatus of claim 12, wherein said means for modifying comprises:
    means for obtaining a number of acknowledgements transmitted by the Node B;
    means for determining that the obtained number of acknowledgements is above a threshold; and
    means for expanding the random delay window based at least in part on the determination that the obtained number of acknowledgements is above the threshold.

15. The apparatus of claim 12, wherein said means for modifying comprises:

means for expanding the random delay window based at least in part on the load condition.

16. The apparatus of claim 12, wherein the load condition is determined by receiving a load condition flag in a message transmitted by the Node B.

17. The apparatus of claim 12, wherein the at least one synchronization code is transmitted as part of a random access procedure.

18. The apparatus of claim 17, wherein the random access procedure is used for at least one of: an initial access, or a hard handover.

19. The apparatus of claim 17, further comprising:
means for terminating the random access procedure when the upper boundary of the random delay window reaches a defined value.

20. The apparatus of claim 12, further comprising:
means for selecting a frame within the modified random delay window within which to transmit a second synchronization code to the Node B.

21. The apparatus of claim 20, wherein the at least one synchronization code is transmitted as part of a request to perform a hard handover, further comprising:
means for receiving a first acknowledgement from the Node B, wherein the first acknowledgement was generated by the Node B with a bias towards establishing communications with the UE requesting to perform the hard handover.

22. The apparatus of claim 12, wherein the wireless communication is enabled in a time division synchronous code division multiple access (TD-SCDMA) system.

23. A computer program product, comprising: a non-transitory computer-readable medium comprising code for: transmitting, by a user equipment (UE), at least one synchronization code to a Node B; determining that the at least one transmitted synchronization code was not acknowledged by the Node B; determining a load condition of the Node B based on acknowledgements for other UEs transmitted by the Node B; and modifying an upper boundary of a random delay window in response to at least one of said determining that the at least one transmitted synchronization code was not acknowledged by the Node B determining the load condition of the Node B based on the acknowledgements for the other UEs transmitted by the Node B.

24. The computer program product of claim 23, wherein the non-transitory computer-readable medium further comprises code for:
obtaining a number of times the UE has attempted to connect to the Node B; and
expanding the random delay window based at least in part on the obtained number.

25. The computer program product of claim 23, wherein the non-transitory computer-readable medium further comprises code for:
obtaining a number of acknowledgements transmitted by the Node B;
determining that the obtained number of acknowledgements is above a threshold; and
expanding the random delay window based at least in part on the determination that the obtained number of acknowledgements is above the threshold.

26. The computer program product of claim 23, wherein the non-transitory computer-readable medium further comprises code for:
expanding the random delay window based at least in part on the load condition.

27. The computer program product of claim 23, wherein the load condition is determined by receiving a load condition flag in a message transmitted by the Node B.

28. The computer program product of claim 23, wherein the at least one synchronization code is transmitted as part of a random access procedure.

29. The computer program product of claim 28, wherein the random access procedure is used for at least one of: an initial access, or a hard handover.

30. The computer program product of claim 28, wherein the non-transitory computer-readable medium further comprises code for:
terminating the random access procedure when the upper boundary of the random delay window reaches a defined value.

31. The computer program product of claim 23, wherein the non-transitory computer-readable medium further comprises code for:
selecting a frame within the modified random delay window within which to transmit a second synchronization code to the Node B.

32. The computer program product of claim 23, wherein the at least one synchronization code is transmitted as part of a request to perform a hard handover, and wherein the non-transitory computer-readable medium further comprises code for:
receiving a first acknowledgement from the Node B, wherein the first acknowledgement was generated by the Node B with a bias towards establishing communications with the UE requesting to perform the hard handover.

33. The computer program product of claim 23, wherein the non-transitory computer program product is enabled in a time division synchronous code division multiple access (TD-SCDMA) system.

34. An apparatus for wireless communication, comprising: at least one processor; and a memory coupled to the at least one processor, wherein the at least one processor is configured to: transmit, by a user equipment (UE), at least one synchronization code to a Node B; determine that the at least one transmitted synchronization code was not acknowledged by the Node B; determine a load condition of the Node B based on acknowledgements of other UEs transmitted by the Node B; and modify an upper boundary of a random delay window in response to at least one of said determining that the at least one transmitted synchronization code was not acknowledged by the Node B or determining the load of the Node B condition based on the acknowledgements of the other UEs transmitted by the Node B.

35. The apparatus of claim 34, wherein the at least one processor is further configured to:
obtain a number of times the UE has attempted to connect to the Node B; and
expand the random delay window based at least in part on the obtained number.

36. The apparatus of claim 34, wherein the at least one processor is further configured to:
obtain a number of acknowledgements transmitted by the Node B;
determine that the obtained number of acknowledgements is above a threshold; and
expand the random delay window based at least in part on the determination that the obtained number of acknowledgements is above the threshold.

37. The apparatus of claim 34, wherein the at least one processor is further configured to:

expand the random delay window based at least in part on the load condition.

38. The apparatus of claim 34, wherein the load condition is determined by receiving a load condition flag in a message transmitted by the Node B.

39. The apparatus of claim 34, wherein the at least one synchronization code is transmitted as part of a random access procedure.

40. The apparatus of claim 39, wherein the random access procedure is used for at least one of: an initial access, or a hard handover.

41. The apparatus of claim 39, wherein the at least one processor is further configured to:
   terminate the random access procedure when the upper boundary of the random delay window reaches a defined value.

42. The apparatus of claim 34, wherein the at least one processor is further configured to:
   select a frame within the modified random delay window within which to transmit a second synchronization code to the Node B.

43. The apparatus of claim 42, wherein the at least one synchronization code is transmitted as part of a request to perform a hard handover, and wherein the at least one processor is further configured to:
   receive a first acknowledgement from the Node B, wherein the first acknowledgement was generated by the Node B with a bias towards establishing communications with the UE requesting to perform the hard handover.

44. The apparatus of claim 34, wherein the wireless communication is enabled in a time division synchronous code division multiple access (TD-SCDMA) system.

45. A method of wireless communication, comprising:
   transmitting a load condition flag of a Node B to a UE; and
   receiving at least one synchronization code at the Node B, the at least one synchronization code transmitted based at least in part on a modified random delay window, the random delay window modified based at least in part on the load condition flag or a determination of a load condition of the Node B based at least in part on acknowledgements for other UEs transmitted by the Node B.

46. An apparatus for wireless communication, comprising:
   means for transmitting a load condition flag of a Node B to a UE; and
   means for receiving at least one synchronization code at the Node B, the at least one synchronization code transmitted based at least in part on a modified random delay window, the random delay window modified based at least in part on a load condition determined based at least in part on the load condition flag or a determination of a load condition of the Node B based at least in part on acknowledgements for other UEs transmitted by the Node B.

47. A computer program product, comprising:
a non-transitory computer-readable medium comprising code for:
   transmitting a load condition flag of a Node B to a UE; and
   receiving at least one synchronization code at the Node B, the at least one synchronization code transmitted based at least in part on a modified random delay window, the random delay window modified based at least in part on a load condition determined based at least in part on the load condition flag or a determination of a load condition of the Node B based at least in part on acknowledgements for other UEs transmitted by the Node B.

48. An apparatus for wireless communication, comprising:
at least one processor; and
a memory coupled to the at least one processor,
wherein the at least one processor is configured to:
   transmit a load condition flag of a Node B to a UE; and
   receive at least one synchronization code at the Node B, the at least one synchronization code transmitted based at least in part on a modified random delay window, the random delay window modified based at least in part on a load condition determined based at least in part on the load condition flag or a determination of a load condition of the Node B based at least in part on acknowledgements for other UEs transmitted by the Node B.

* * * * *